(12) United States Patent
Keeney et al.

(10) Patent No.: US 9,927,020 B2
(45) Date of Patent: Mar. 27, 2018

(54) AXLE ASSEMBLY

(71) Applicant: ArvinMeritor Technology LLC, Troy, MI (US)

(72) Inventors: Christopher Keeney, Troy, MI (US); Todd R. Ekonen, Howell, MI (US); Fabio Santinato, Novara (IT); Dale Kwasniewski, Galesburg, MI (US); Danny Seaman, Kutztown, PA (US); Robert J. Martin, Newark, OH (US); Ben Bradley, Minetto, NY (US); Sean Gainey, Southfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 563 days.

(21) Appl. No.: 14/295,966

(22) Filed: Jun. 4, 2014

(65) Prior Publication Data

US 2015/0354691 A1 Dec. 10, 2015

(51) Int. Cl.
*F16H 57/037* (2012.01)
*F16H 57/04* (2010.01)
*F16H 57/02* (2012.01)

(52) U.S. Cl.
CPC ......... *F16H 57/037* (2013.01); *F16H 57/045* (2013.01); *F16H 57/0457* (2013.01); *F16H 57/0483* (2013.01); *F16H 2057/02052* (2013.01); *Y10T 74/2188* (2015.01)

(58) Field of Classification Search
CPC .. B60B 35/16; Y10T 74/2189; Y10T 74/2188
See application file for complete search history.

(56) References Cited

U.S. PATENT DOCUMENTS

| 1,966,434 A | | 7/1934 | Barker |
| 2,242,195 A | | 5/1941 | Teker et al. |
| 3,800,913 A | * | 4/1974 | Schmitt ............... F01M 1/12 184/6.13 |
| 4,625,581 A | * | 12/1986 | Hull ............ F16H 57/029 74/606 R |
| 4,683,985 A | * | 8/1987 | Hultgren .......... F16H 57/0421 184/11.2 |
| 5,161,644 A | * | 11/1992 | Swenskowski ..... F16H 57/0447 180/339 |

(Continued)

FOREIGN PATENT DOCUMENTS

| DE | 710894 C | 9/1941 |
| EP | 1375970 A2 | 1/2004 |

(Continued)

OTHER PUBLICATIONS

European Patent Office, Extended European Search Report for the corresponding European Patent Application No. 15169126.8 dated May 30, 2016.

(Continued)

*Primary Examiner* — Daniel D Yabut
(74) *Attorney, Agent, or Firm* — Brooks Kushman P.C.

(57) ABSTRACT

An axle assembly that may have a housing and a carrier housing. The axle assembly may include one or more quiet lubricant reservoirs that may not receive rotating components of the axle assembly. A seal may be provided in a channel that may be disposed between the housing and the carrier housing.

20 Claims, 7 Drawing Sheets

(56) References Cited

U.S. PATENT DOCUMENTS

| | | | | |
|---|---|---|---|---|
| 5,232,291 | A | * | 8/1993 | Kuan .................. F16C 19/548 |
| | | | | 184/11.1 |
| 5,540,300 | A | | 7/1996 | Downs et al. |
| 5,644,954 | A | * | 7/1997 | Matsufuji ............. F16H 37/043 |
| | | | | 74/606 R |
| 5,839,327 | A | * | 11/1998 | Gage .................. F16H 57/0412 |
| | | | | 184/11.1 |
| 6,132,329 | A | | 10/2000 | Tison |
| 2004/0144597 | A1 | * | 7/2004 | Metelues ............ F16H 57/0483 |
| | | | | 184/6.2 |
| 2010/0009803 | A1 | * | 1/2010 | Giger .................. F16H 37/0833 |
| | | | | 475/346 |
| 2011/0162482 | A1 | | 7/2011 | Jacobs et al. |
| 2012/0073403 | A1 | | 3/2012 | Perakes et al. |
| 2013/0274054 | A1 | * | 10/2013 | Barillot ............... F16H 57/0409 |
| | | | | 475/160 |
| 2013/0296095 | A1 | | 11/2013 | Kwasniewski et al. |
| 2014/0069230 | A1 | | 3/2014 | Trost |
| 2014/0251080 | A1 | * | 9/2014 | McGuire ............... F16H 57/029 |
| | | | | 74/606 R |

FOREIGN PATENT DOCUMENTS

| | | |
|---|---|---|
| EP | 1707423 A2 | 10/2006 |
| EP | 2708777 A1 | 3/2014 |
| JP | 5937462 U | 9/1984 |
| JP | 2012210839 A | 11/2012 |

OTHER PUBLICATIONS

European Patent Office, European Search Report for the corresponding European Patent Application No. 15169126.8 dated Feb. 3, 2016.

United States Patent and Trademark Office, U.S. Appl. No. 14/169,454, filed Jan. 31, 2014.

European Patent Office, Extended European Search Report for the corresponding European Patent Application No. 16192413.9 dated Jan. 20, 2017.

Dow Corning Corporation, "Dispensible Adhesives/Sealants for Automotive Applications—Sealing Methods Tutorial," 2010, USA.

Henkel Corporation, "Loctite Mold-in-Place Gasket Technology," 2008, Madison Heights, Michigan, USA.

Parker Chomerics, "Molded In-Place Cover Seals," date unknown.

* cited by examiner

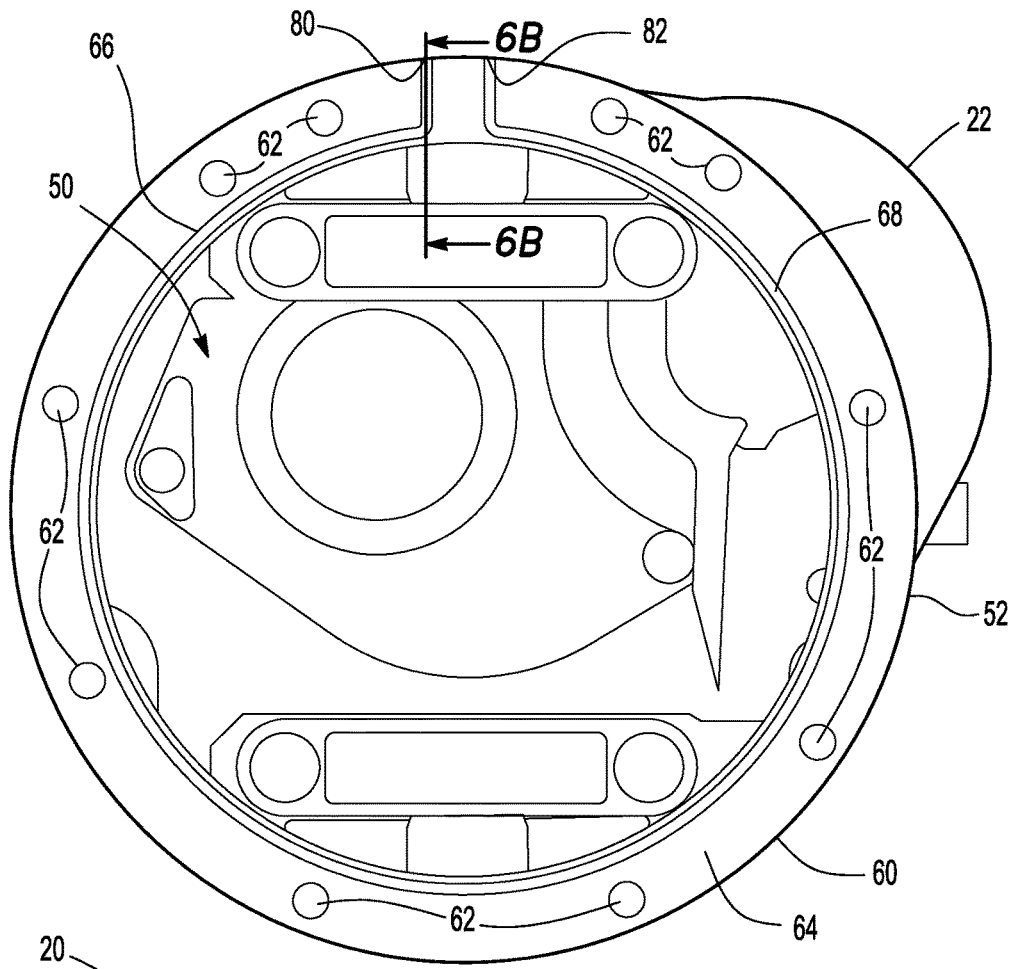
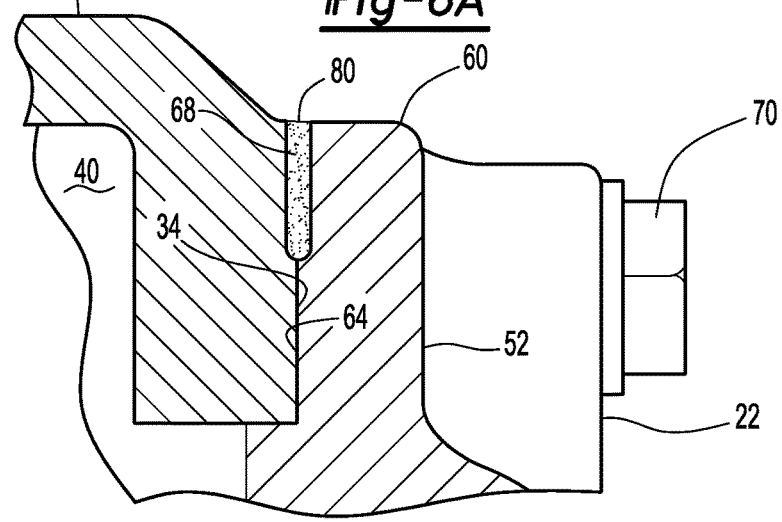
Fig-6A
Fig-6B

AXLE ASSEMBLY

TECHNICAL FIELD

This patent application relates to an axle assembly.

BACKGROUND

An axle assembly lubrication apparatus is disclosed in U.S. Pat. No. 6,132,329.

SUMMARY

In at least one embodiment, an axle assembly is provided. The axle assembly may include a housing and a carrier housing. The housing may have a center portion that may receive a differential. The carrier housing may be mounted to the housing and may include a carrier housing cavity and a carrier housing lubricant reservoir. The carrier housing cavity may receive an input shaft that may provide torque to the differential. The carrier housing lubricant reservoir may have a cavity that receives a lubricant. The carrier housing lubricant reservoir may be at least partially defined by the carrier housing and a carrier housing partition wall that extends from the carrier housing and that may separate the cavity from the carrier housing cavity and the input shaft such that no rotating component is disposed in the carrier housing lubricant reservoir.

In at least one embodiment, an axle assembly is provided. The axle assembly may include a housing that may have a center portion and a housing lubricant reservoir. The center portion may receive a differential. First and second arm portions may extend from the center portion. The housing lubricant reservoir may be disposed proximate the center portion and may be spaced apart from the first and second arm portions. The housing lubricant reservoir may have a cavity that receives a lubricant. The housing lubricant reservoir may be at least partially defined by the housing and a housing partition wall that separates the cavity from the differential such that the differential is not disposed in the housing lubricant reservoir.

In at least one embodiment, an axle assembly is provided. The axle assembly may include a housing, a carrier housing, a channel, and a seal. The carrier housing may be mounted to the housing. The channel may be disposed between the housing and the carrier housing such that the housing and carrier housing may cooperate to at least partially define the channel. The channel may have an inlet and an outlet. The seal may be disposed in the channel. The seal may be inserted into the channel via the inlet after the carrier housing is mounted to the housing and may extend to the outlet.

BRIEF DESCRIPTION OF THE DRAWINGS

FIG. 5b is a section view of the axle assembly including the carrier housing of FIG. 5a.
FIG. 6a is a side view of a second embodiment of a carrier housing and a seal.
FIG. 6b is a section view of the axle assembly including the carrier housing of FIG. 6a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
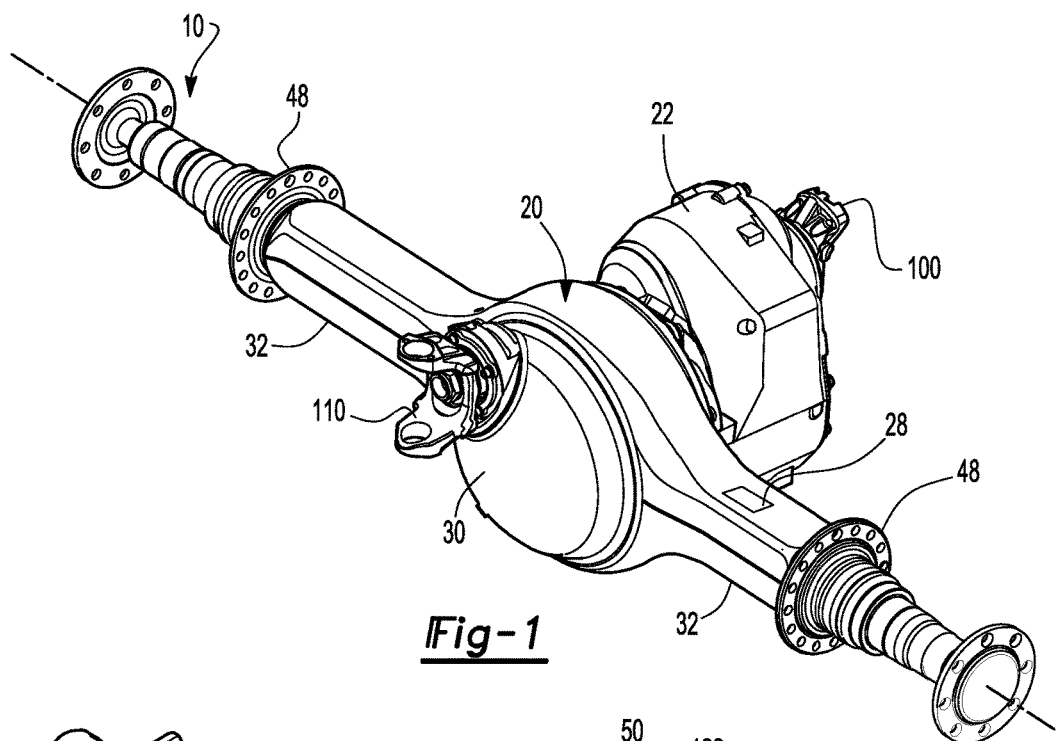
FIG. 1 is a perspective view of an axle assembly.
Figure 2:
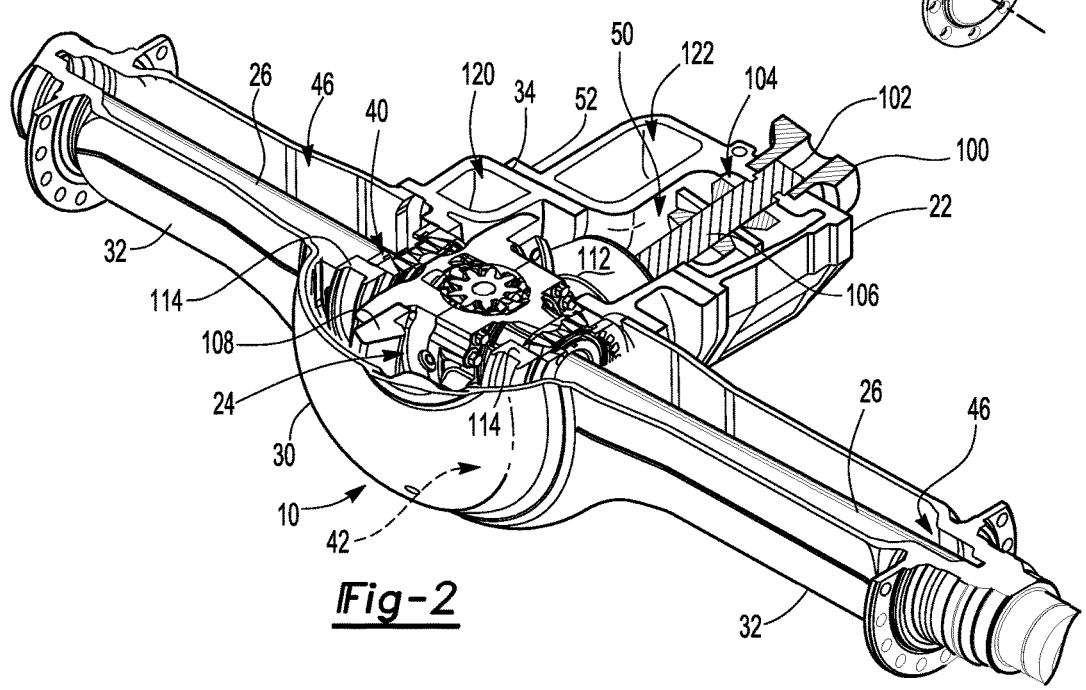
FIG. 2 is a section view of the axle assembly of FIG. 1.

Referring to FIGS. 1 and 2, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 shown in FIG. 1 may be part of a tandem axle configuration or multi-axle configuration that may include a plurality of axle assemblies that may be connected in series.

The axle assembly 10 may include a housing 20, a carrier housing 22, a differential 24, at least one axle 26, and an RFID tag 28.

The housing 20 may receive various components of the axle assembly 10. In addition, the housing 20 may facilitate mounting of the axle assembly 10 to the vehicle. The housing 20 may include multiple components that may be assembled together in any suitable manner, such as by welding and/or with one or more fasteners. In at least one embodiment, the housing 20 may include a center portion 30, at least one arm portion 32, and a carrier housing mounting surface 34, which is also shown in FIGS. 5b and 6b.

The center portion 30 may be disposed proximate the center of the housing 20. The center portion 30 may define a center portion cavity 40 that may receive the differential 24. The region of the center portion cavity 40 located below the differential 24 may at least partially define a sump portion 42 that may contain a lubricant 44. Splashed lubricant may flow down the sides of the center portion 30 and gather in the sump portion 42. The lubricant, which may be a liquid such as oil, may lubricate components of the axle assembly 10, such as the differential 24 and various bearings, as will be discussed in more detail below.

One or more arm portions 32 may extend from the center portion 30. In the embodiment shown in FIGS. 1 and 2, two arm portions 32 are provided that extend in opposite directions from the center portion 30 and away from the differential 24. An arm portion 32 or a portion thereof may be integrally formed with the center portion 30 in one or more embodiments. Each arm portion 32 may define an arm cavity 46 that may receive an axle 26. The arm portion 32 and arm cavity 46 may be disposed above the sump portion 42 in one or more embodiments. Each arm portion 32 may also have a brake mounting flange 48 that may be disposed proximate an end of the arm portion 32.

Figure 5A:
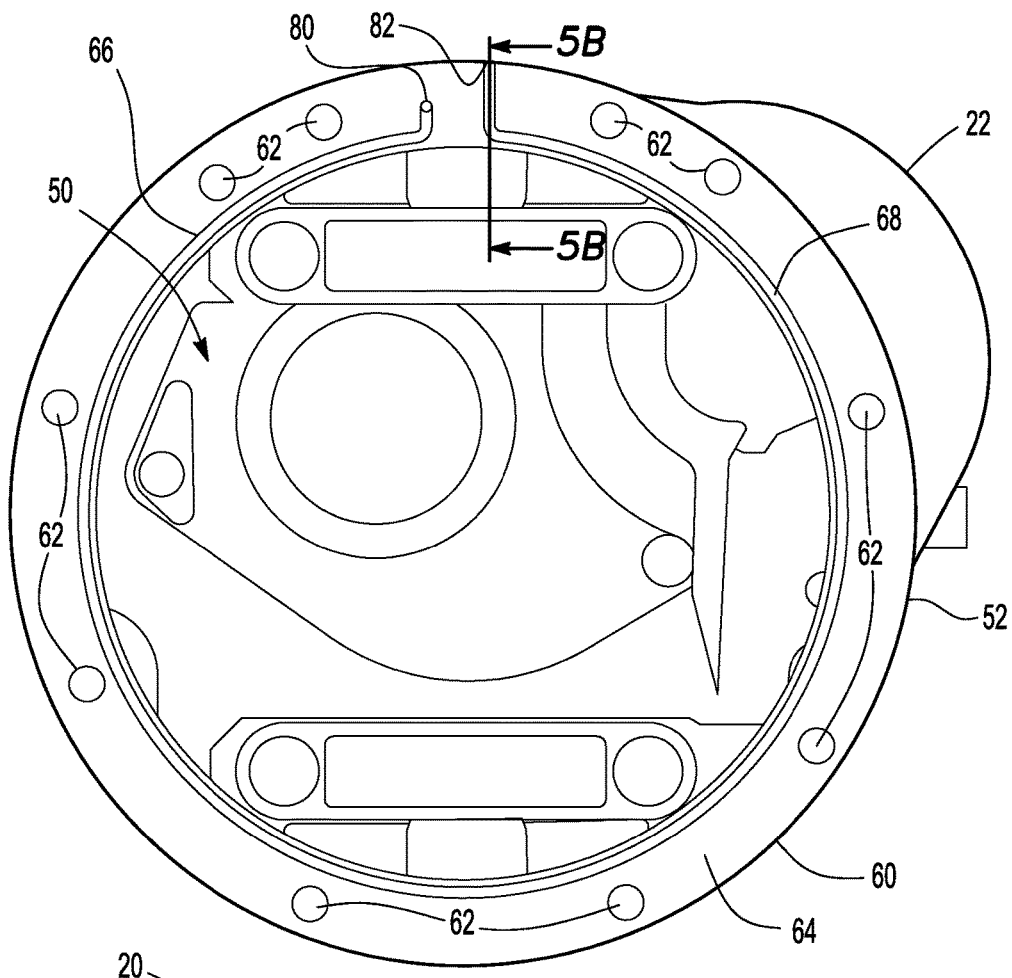
FIG. 5a is a side view of a carrier housing and a seal of the axle assembly.
Figure 5B:
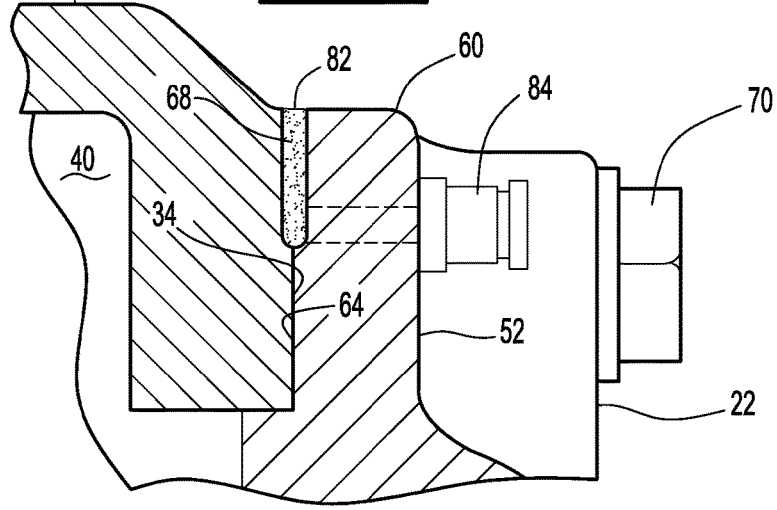

Referring to FIGS. 2, 5b and 6b, the carrier housing mounting surface 34 of the housing 20 may face toward and may engage the carrier housing 22. A set of holes may be provided in the carrier housing mounting surface 34 to facilitate mounting of the carrier housing 22 as will be discussed in more detail below.

Referring to FIG. 2, the carrier housing 22, which may also be called a differential carrier, may be mounted to the center portion 30 of the housing 20. The carrier housing 22 may support components of the differential 24 and may also define a carrier housing cavity 50 that may receive at least a portion of the differential 24. In at least one embodiment, the carrier housing 22 may have a flange portion 52, which is best shown in FIGS. 5a-6b. The flange portion 52 may encircle or extend around the carrier housing cavity 50 such that the flange portion 52 extends outward or away from the carrier housing cavity 50. In at least one embodiment, the flange portion 52 may include a perimeter surface 60, a set of fastener holes 62, and a mating surface 64. The flange portion 52 may also at least partially define a channel 66 that may receive a seal 68.

The perimeter surface 60 may at least partially define an outside perimeter of the flange portion 52. The perimeter surface 60 may be disposed opposite the carrier housing cavity 50 and may extend substantially perpendicular from the housing 20 and/or the carrier housing mounting surface 34 of the housing 20.

The set of fastener holes 62 may be holes that extend completely through the flange portion 52. The fastener holes 62 may be spaced apart from each other and may be arranged around the carrier housing cavity 50. The fastener holes 62 may be disposed outward from the carrier housing cavity 50 and may be aligned with corresponding holes on the carrier housing mounting surface 34 of the housing 20. Each fastener hole 62 may receive a corresponding fastener 70, such as a bolt, that may couple the carrier housing 22 to the housing 20.

The mating surface 64 may face toward and may engage the carrier housing mounting surface 34 of the housing 20. The carrier housing mounting surface 34 and the mating surface 64 may cooperate to at least partially define the channel 66.

The channel 66 may be provided in various configurations. In each configuration, the channel 66 may include an inlet 80 and an outlet 82.

Referring to FIGS. 5a and 5b, the channel 66 is depicted as a groove or indentation that is formed in the housing 20 and the flange portion 52. More specifically, the channel 66 may be formed in both the carrier housing mounting surface 34 and the mating surface 64; however, it is contemplated that at least a portion of the channel 66 may be configured as a groove in the housing 20 but not in the carrier housing 22 (i.e., the groove may be provided in the carrier housing mounting surface 34 but not the mating surface 64) or in the carrier housing 22 but not the housing 20 (i.e., the groove may be provided in the mating surface 64 but not the carrier housing mounting surface 34). Regardless of which component or components include the groove, the channel 66 may extend completely or almost completely around the carrier housing cavity 50 and may be disposed inward of the fastener holes 62. As such, the channel 66 may be disposed between and may be spaced apart from the carrier housing cavity 50 and the set of fastener holes 62.

The inlet 80 may extend from an exterior surface of the housing 20 and/or carrier housing 22. The inlet 80 may receive the seal 68 after the carrier housing 22 is mounted to the housing 20. For example, the seal 68 may be injected under pressure into the inlet 80 and then flow through the channel 66 to the outlet 82. The seal 68 may then exit the outlet 82 or may be visible in the outlet 82 to provide visual confirmation that the seal 68 has flowed through the channel 66 and has not been blocked by an obstruction in the channel 66 during injection. The inlet 80 may be spaced apart from the outlet 82, which may also extend from an exterior surface of the housing 20 and/or carrier housing 22.

The inlet 80 and outlet 82 may be provided in various configurations. In FIG. 5a, the inlet 80 is configured as a hole that extends through the flange portion 52. As such, the carrier housing 22 but not the housing 20 may define the inlet 80. As shown in FIG. 5b, a fitting 84 may be provided on the flange portion 52 that may facilitate injection of the seal 68 into the inlet 80. The outlet 82 may also be configured as a hole like the inlet 80 or may be disposed between the housing 20 and the carrier housing 22 such that the housing 20 and carrier housing 22 cooperate to define the outlet 82 as shown in FIG. 5b. As such, the outlet 82 may extend to the perimeter surface 60 of the flange portion 52 and/or housing 20. The inlet 80 and the outlet 82 may be disposed near each other and may both be disposed between adjacent fastener holes of the carrier housing 22 and/or adjacent fastener holes 62 in the flange portion 52.

Referring to FIGS. 6a and 6b, another configuration of a channel 66 and seal 68 is shown. In this configuration, the inlet 80 and outlet 82 are both disposed between the housing 20 and the carrier housing 22 such that the housing 20 and carrier housing 22 cooperate to define the inlet 80 and the outlet 82. As such, the inlet 80 may extend from the perimeter surface 60 of the flange portion 52 and/or housing 20 and the outlet 82 may extend to the perimeter surface 60 of the flange portion 52 and/or housing 20. The inlet 80 and the outlet 82 may again be spaced apart and may both be disposed between adjacent fastener holes 62 in the flange portion 52.

Figure 7:
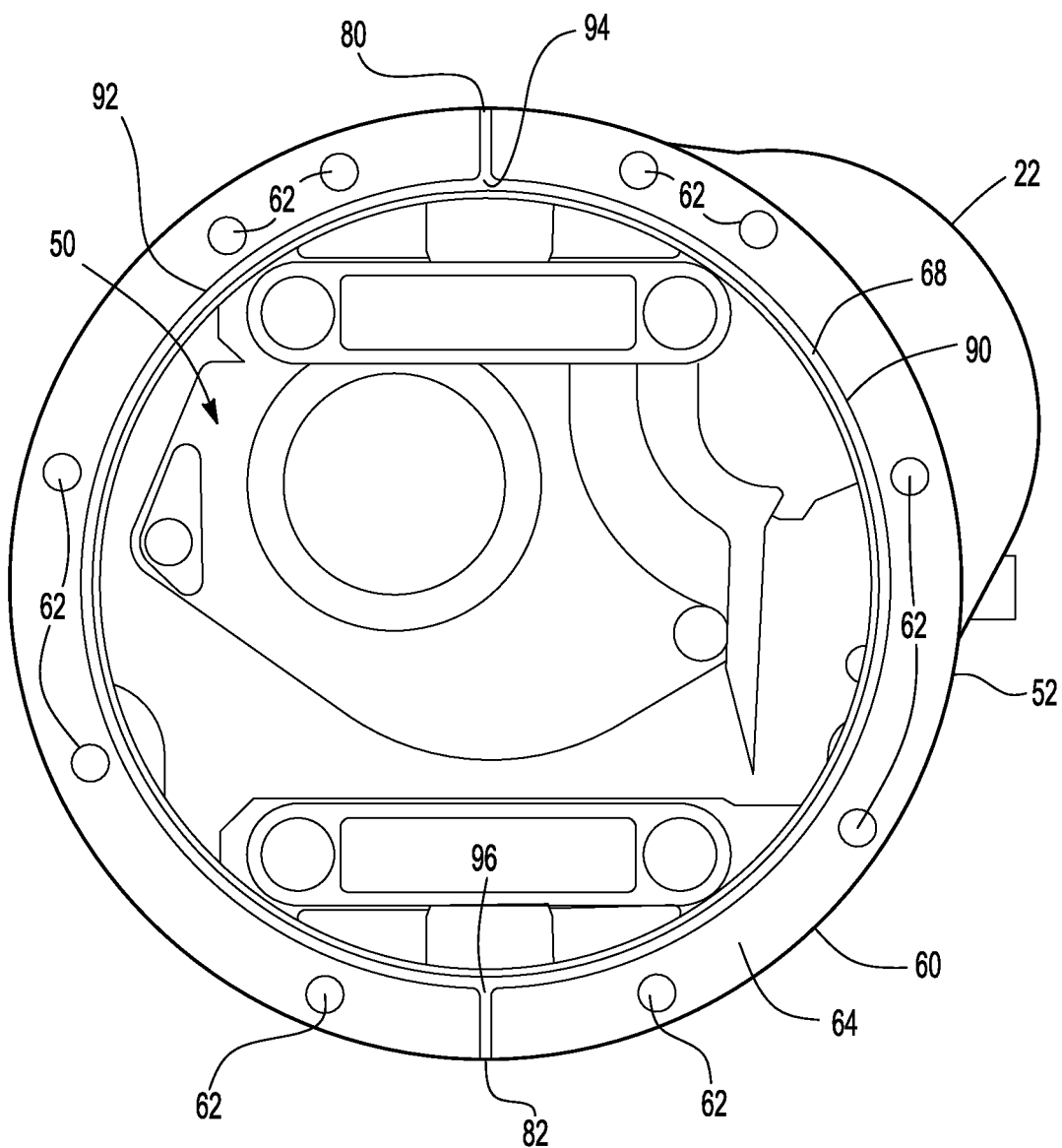
FIG. 7 is a side view of a third embodiment of a carrier housing.

Referring to FIG. 7, another configuration of a channel 66 and seal 68 is shown. In this configuration, the channel 66 has a first channel portion 90 and a second channel portion 92. The first channel portion 90 and the second channel portion 92 may extend around opposite sides of the carrier housing cavity 50 to completely and continuously encircle the carrier housing cavity 50. The first channel portion 90 and the second channel portion 92 may intersect at a first point 94 located near the inlet 80 and may intersect again at a second point 96 that may be located near the outlet 82, which may be disposed on an opposite side of the carrier housing cavity 50 from the inlet 80. The first channel portion 90 and the second channel portion 92 may have substantially equal lengths to help ensure that the seal 68 fills both channel portions 90, 92. As such, the seal 68 may be injected through the inlet 80, flow through both the first and second channel portions 90, 92, and may meet proximate the second point 96. The inlet 80 and outlet 82 may be disposed between the housing 20 and the carrier housing 22 as shown or the inlet 80 and/or outlet 82 may be configured as a through hole similar to the inlet 80 in FIG. 5a.

The seal 68 may engage the housing 20 and the carrier housing 22 and may extend continuously through the channel 66 from the inlet 80 to the outlet 82. The seal 68 may be made of any suitable material, such as an epoxy or room temperature vulcanizing (RTV) sealant that has sufficiently good flowability or sufficiently low viscosity to flow through the channel 66 before curing.

Referring again to FIG. 2, the differential 24 may be disposed in the housing 20. The differential 24 may be configured to transmit torque to the vehicle traction wheel assemblies and permit the traction wheel assemblies to rotate at different velocities. An input yoke 100, an input shaft 102, an interaxle differential unit 104, an intermediate shaft 106, a ring gear 108, and an optional output yoke 110 are shown to facilitate an abbreviated discussion of the operation of the axle assembly 10 and differential 24.

The input yoke 100 may facilitate coupling of the axle assembly 10 to a torque source. For example, the input yoke 100 may be coupled to a drive shaft that may be coupled to an output of a vehicle transmission. Alternatively, the input yoke 100 may be coupled to a connection shaft or prop shaft that may be coupled to an output yoke 110 of another axle assembly or a transfer case. The input yoke 100 may be disposed on the input shaft 102.

The input shaft 102 may be rotatably supported by one or more bearings that may be disposed in the carrier housing cavity 50 of the carrier housing 22. The input shaft 102 may be provided with or may be operatively connected to an interaxle differential unit 104, which may be provided when the axle assembly 10 is connected to another axle assembly. The interaxle differential unit 104 may compensate for speed differences between different drive axle assemblies. In at least one embodiment, the interaxle differential unit 104 may include one or more pinion gears that may be disposed on a spider and may operatively connect the input shaft 102 to the intermediate shaft 106. The interaxle differential unit 104 may also be provided in other locations, such as downstream from the ring gear 108.

The intermediate shaft 106 may be configured to provide torque to the ring gear 108 and to the output yoke 110, if provided. For example, a pinion gear 112 may be coupled to the intermediate shaft 106. Torque that is provided to the input yoke 100 and input shaft 102 may be transmitted to the ring gear 108 via a pinion gear 112.

The ring gear 108 may rotate about an axis and may splash lubricant that accumulates in the sump portion 42 as it rotates. As will be discussed in more detail below, such lubricant may be captured and temporarily retained or stored in a lubricant reservoir to reduce the volume of lubricant in the sump portion 42 under various operating conditions. Reducing the volume of lubricant in the sump portion 42 may reduce churning losses or frictional drag that may be exerted upon the ring gear 108 by the lubricant and may improve vehicle fuel economy. Torque may be transmitted from the ring gear 108 to each axle 26 via the differential 24.

The differential 24 may be generally disposed in the center portion 30 of the housing 20 and may be configured to permit the axles 26 to rotate at different speeds. The differential 24 may be supported by a pair of differential bearing supports 114. The differential 24 may receive torque via the ring gear 108 and provide torque to the axles 26.

The axles 26 may transmit torque from the differential 24 to corresponding traction wheel assemblies. In FIG. 2, two axles 26 are provided such that each axle 26 extends through a different arm cavity 46. The axles 26 may extend along and may be rotated about an axis by the differential 24. Each axle 26 may have a first end and a second end. The first end may be coupled to the differential 24. The second end may be disposed opposite the first end and may be located outside of the housing 20. An axle flange may be disposed at the second end and may facilitate mounting of a wheel end assembly and traction wheel assembly. An axle bearing (not shown) may be provided between the first and second ends of the axle 26 to rotatably support the axle 26.

At least one lubricant reservoir may be provided with the axle assembly 10 to receive lubricant and/or temporarily contain or retain a volume of lubricant that might otherwise accumulate in the sump portion 42. The lubricant reservoir may be a "quiet" reservoir in which the lubricant is stored in a cavity that is separated from and that does not receive rotating components of the axle assembly 10, such as the differential 24, axles 26, input shaft 102, interaxle differential unit 104, intermediate shaft 106, ring gear 108, or pinion gear 112. As such, the lubricant reservoir may not contain components that may churn the lubricant. A first carrier housing lubricant reservoir 120 (which may also be referred to a housing lubricant reservoir) and/or a second carrier housing lubricant reservoir 122 may be provided with the carrier housing 22. The carrier housing lubricant reservoirs 120, 122 may not be disposed in the arm portion 32 of the housing 20.

Figure 3:
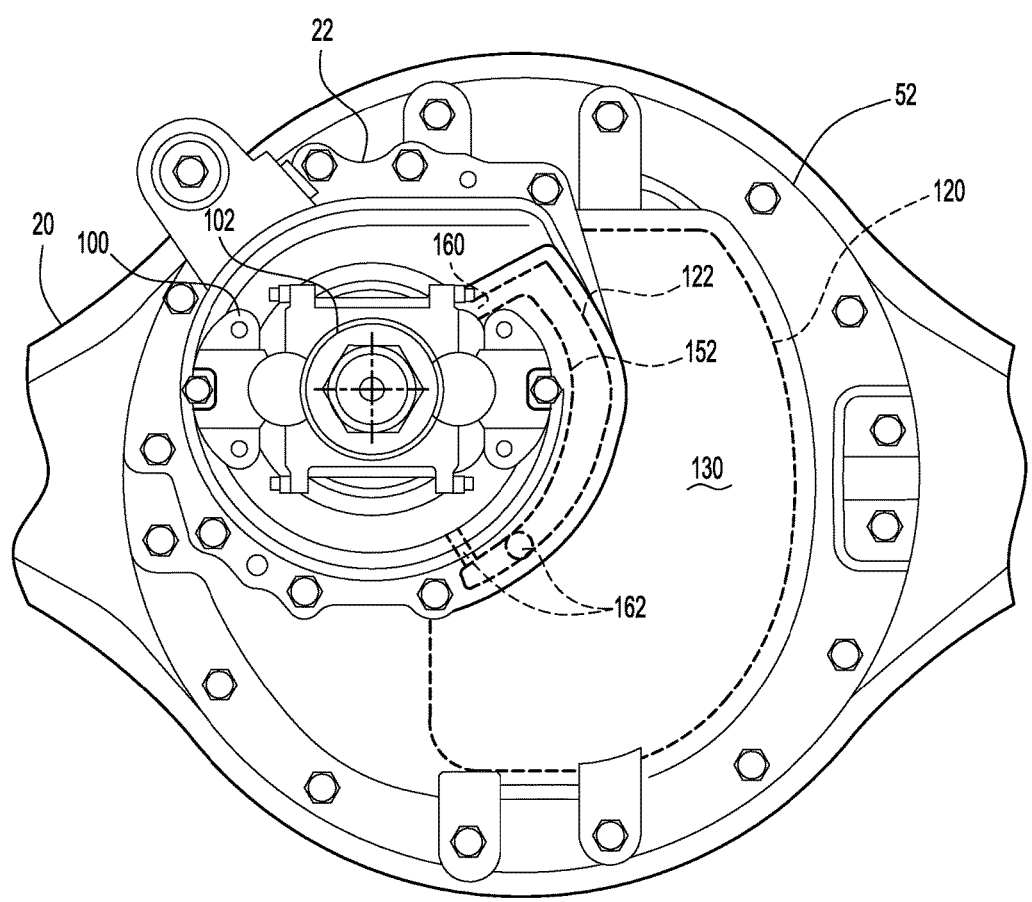
FIG. 3 is a back side view of the axle assembly from the perspective shown in FIG. 1.
Figure 4:
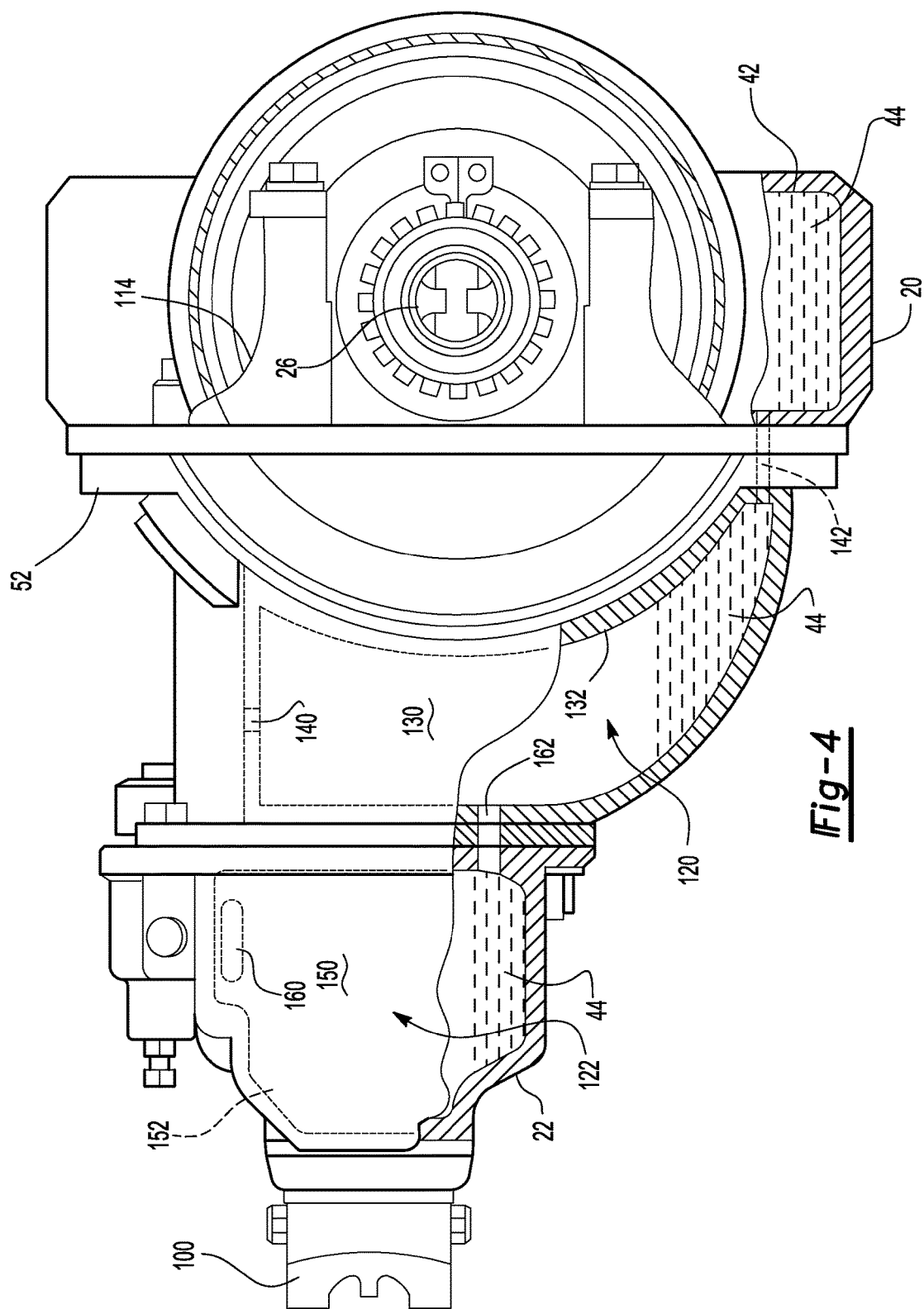
FIG. 4 is a left side view of the axle assembly.

Referring to FIGS. 2-4, an example of a first carrier housing lubricant reservoir 120 is shown. The housing lubricant reservoir 120 may be disposed proximate the center portion 30 of the housing 20 and may be separated from or spaced apart from the arm portions 32. The first carrier housing lubricant reservoir 120 may have a cavity 130 that may receive and hold lubricant. The first carrier housing lubricant reservoir 120 and cavity 130 may be at least partially defined by the housing 20 and a housing partition wall 132. The housing partition wall 132 may be disposed inside the housing 20 and may separate the cavity 130 from the center portion cavity 40 and the differential 24. For example, the housing partition wall 132 may extend from an interior surface of the housing 20 and may be disposed between an exterior wall of the housing 20 and the center portion cavity 40. The housing partition wall 132 may be substantially solid or free of voids except for at least one inlet port and at least one outlet port as will be discussed in more detail below. As such, the differential 24 and other rotating parts may not be disposed in the cavity 130 of the first carrier housing lubricant reservoir 120.

As shown in FIGS. 2 and 3, the first carrier housing lubricant reservoir 120 may be at least partially or entirely disposed to a lateral side of the input shaft 102 when the input shaft 102 is offset from the center of the center portion 30. In addition, the first carrier housing lubricant reservoir 120 may hold a larger volume of lubricant than the second carrier housing lubricant reservoir 122 and may extend above and below the second carrier housing lubricant reservoir 122 in one or more embodiments. Since the first carrier housing lubricant reservoir 120 may be provided with the housing 20, the first carrier housing lubricant reservoir 120 may be disposed between the second carrier housing lubricant reservoir 122 and the sump portion 42 or closer to the sump portion 42 than the second carrier housing lubricant reservoir 122 as is best shown in FIG. 4. Alternatively the carrier housing lubricant reservoirs 120, 122 may not be connected in series, but may be connected in parallel with the sump portion 42 in one or more embodiments.

Referring to FIG. 4, the first carrier housing lubricant reservoir 120 may include an inlet port 140 and an outlet port 142. The inlet port 140 and the outlet port 142 may be spaced apart from each other and may be provided in the housing partition wall 132 in one or more embodiments. Lubricant may enter the first carrier housing lubricant reservoir 120 via the inlet port 140 and exit to the center portion cavity 40 and sump portion 42 via the outlet port 142. The inlet port 140 may be disposed above the outlet port 142 and may receive lubricant that is splashed by rotating components, such as the differential 24 and/or ring gear 108. For example, the inlet port 160 may be configured as a scoop or open sided channel that may collect lubricant or any suitable opening that may be open on top or in a manner that may receive lubricant in one or more embodiments. The outlet port 142 may be sized to control the flow of lubricant out of the housing lubricant reservoir 120. For instance, the outlet port 142 may be sized such that the volume of lubricant that flows out of the first carrier housing lubricant reservoir 120 exceeds the volume of lubricant that flows into the first carrier housing lubricant reservoir 120 at low vehicle speeds (i.e., low differential rotational speeds) but is less than the volume of lubricant 44 that flows into the first carrier housing lubricant reservoir 120 at high vehicle speeds (i.e., high differential rotational speeds). As such, the volume of lubricant in the sump portion 42 and associated frictional drag may be reduced at higher speeds. Optionally, a valve may be provided with outlet port 142 to control the flow of lubricant. Such a valve may actively controlled, such as with a control module and/or an actuator or may be a passive valve, such as a bimetallic valve that may include different metals or metal alloys that expand at different rates in response to temperature. As such, a bimetallic valve may be configured to open at higher axle assembly operating temperatures to permit the flow of lubricant from the first carrier housing lubricant reservoir 120 to the sump portion 42 and to close at lower temperatures.

Referring to FIGS. 2-4, the second carrier housing lubricant reservoir 122 may be disposed proximate the carrier housing cavity 50 of the carrier housing 20. The second carrier housing lubricant reservoir 122 may have a cavity 150 that may receive and hold lubricant. The second carrier housing lubricant reservoir 122 may be at least partially defined by the carrier housing 22 and a carrier housing partition wall 152. For example, the carrier housing partition wall 152 may extend from an interior surface of the carrier housing 22 or the flange portion 52 and may be disposed between an exterior wall of the carrier housing 22 and the carrier housing cavity 50. The carrier housing partition wall 152 may be substantially solid or free of voids except for an inlet port and/or an outlet port as will be discussed in more detail below. The carrier housing partition wall 152 may separate the cavity 150 from the carrier housing cavity 50 and the input shaft 102 and/or interaxle differential unit 104. As such, the input shaft 102, interaxle differential unit 104, and any rotating parts may not be disposed in the cavity 150 of the second carrier housing lubricant reservoir 122.

As shown in FIGS. 2 and 3, the second carrier housing lubricant reservoir 122 may be at least partially or entirely disposed to a lateral side of the input shaft 102 and/or interaxle differential unit 104 when the input shaft 102 is offset from the center of the center portion 30. The second carrier housing lubricant reservoir 122 may also extend under the input shaft 102.

Referring to FIGS. 3 and 4, the second carrier housing lubricant reservoir 122 may include an inlet port 160 and an outlet port 162. The inlet port 160 and/or the outlet port 162 may be provided in the carrier housing partition wall 152 in one or more embodiments. Lubricant may enter the second carrier housing lubricant reservoir 122 via the inlet port 160 and exit via the outlet port 162. The outlet port 162 may be configured to allow lubricant to exit back to the carrier housing cavity 50 and/or to the first carrier housing lubricant reservoir 120. The inlet port 160 may be disposed above the outlet port 162 and may receive lubricant that is splashed in the carrier housing cavity 50 by rotating components, such as the interaxle differential unit 104 and/or ring gear 108. For example, the inlet port 160 may be configured as a scoop or open sided channel that may collect lubricant in one or more embodiments. The outlet port 162 may be sized to control the flow of lubricant out of the second carrier housing lubricant reservoir 122. For instance, the outlet port 162 may be sized such that the volume of lubricant that flows out of the second carrier housing lubricant reservoir 122 exceeds the volume of lubricant that flows into the second carrier housing lubricant reservoir 122 at low vehicle speeds. Optionally, a valve may be provided with the outlet port 162 to control the flow of lubricant. Such a valve may be actively controlled or may be a passive valve as previously discussed.

Figure 8:
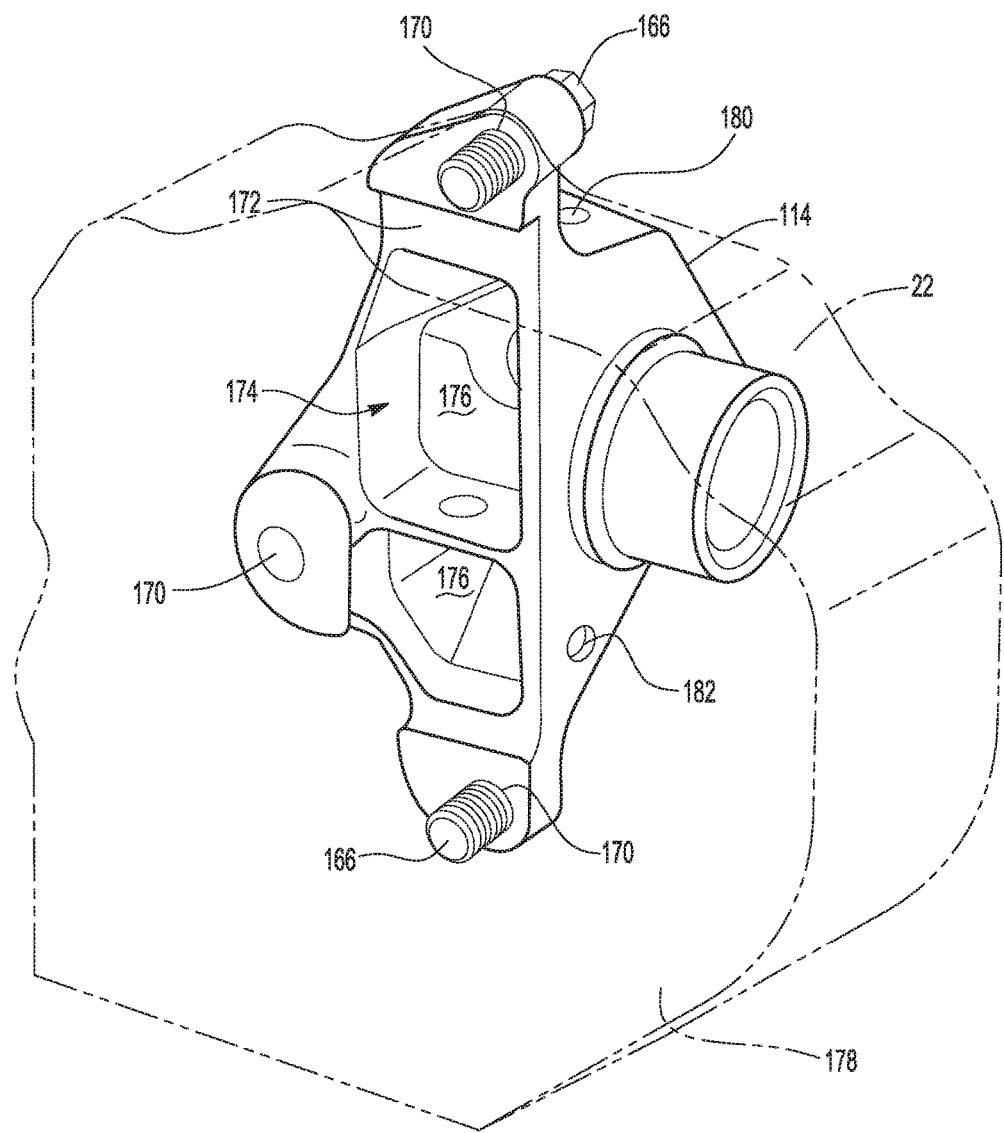
FIG. 8 is a perspective view of an exemplary differential bearing support having a lubricant reservoir with the differential bearing support mounted to a schematic representation of a carrier housing.

Referring to FIG. 8, another example of a lubricant reservoir is shown. In this embodiment, the lubricant reservoir is provided with a differential bearing support 114. The differential bearing support 114 may support a bearing that may support an associated axle 26. In addition, the differential bearing support 114 may be mounted on the carrier housing 22 with fasteners 166, such as bolts, that may extend through mounting holes 170 in the differential bearing support 114. As such, a face surface 172 of the differential bearing support 114 may face toward and may engage an internal surface 178 of the carrier housing 22 and may cooperate with the differential bearing support 114 to define a differential bearing support lubricant reservoir 174 that may have a cavity 176 that may receive and hold lubricant. The differential bearing support lubricant reservoir 174 may be a "quiet" reservoir that does not receive any rotating parts. The differential bearing support lubricant reservoir 174 may include an inlet port 180 and an outlet port 182. The inlet port 180 and/or the outlet port 182 may be provided in an external wall of the differential bearing support 114. Lubricant may enter the differential bearing support lubricant reservoir 174 via the inlet port 180 and exit via the outlet port 182 back to the first carrier housing lubricant reservoir 120. The inlet port 180 may be disposed above the outlet port 182 and may receive lubricant that is splashed in the center portion cavity 40 by rotating components. The outlet port 182 may be sized to control the flow of lubricant out of the differential bearing support lubricant reservoir 174 as previously discussed and may optionally include an active or passive valve as previously discussed.

Referring again to FIG. 1, the RFID (radio-frequency identification) tag 28 may be disposed on the axle assembly 10. For example, the RFID tag 28 may be disposed on a surface of the housing 20 or carrier housing 22, such as an exterior surface. The RFID tag 28 may store data associated with the axle assembly 10, such as the model, part number, warranty information, manufacture date, manufacture location (e.g., manufacturing plant name), specification number, customer name or name of the vehicle original equipment manufacturer (OEM), service manual, maintenance information, specified fastener torques, lubricant volume, lubricant type, shaft end play, service history, and/or information regarding the parts or components of the axle assembly 10. Data stored on the RFID tag 28 may be accessed by a service technician to facilitate maintenance and servicing of the axle assembly 10 to provide immediate access to product information without printouts, printed service manuals, or internet access.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing that has a center portion that receives a differential, first and second arm portions that extend from the center portion, and a housing lubricant reservoir that is disposed proximate the center portion and spaced apart from the first and second arm portions, wherein the housing lubricant reservoir has a cavity that receives a lubricant and a housing partition wall that separates the cavity from the differential such that the differential is not disposed in the housing lubricant reservoir; and
a carrier housing that is mounted to the housing, wherein the carrier housing includes:
a carrier housing cavity that receives an input shaft that provides torque to the differential;
a carrier housing lubricant reservoir that has a cavity that receives the lubricant, wherein the carrier housing lubricant reservoir is at least partially defined by the carrier housing and a carrier housing partition wall that extends from the carrier housing and that separates the cavity of the carrier housing lubricant reservoir from the carrier housing cavity and the input shaft such that no rotating component is disposed in the carrier housing lubricant reservoir, wherein the housing lubricant reservoir is fluidly connected to the carrier housing lubricant reservoir by an outlet port; and
an interaxle differential unit that is coupled to the input shaft and disposed in the carrier housing cavity, wherein the carrier housing partition wall is disposed between the interaxle differential unit and the cavity of the carrier housing lubricant reservoir.

2. The axle assembly of claim 1 wherein the carrier housing partition wall is disposed between the interaxle differential unit and the carrier housing lubricant reservoir and is disposed to a lateral side of the input shaft and the interaxle differential unit.

3. The axle assembly of claim 1 wherein the carrier housing has a flange portion that extends around the carrier housing cavity and that is mounted to the housing, wherein the carrier housing partition wall extends from the flange portion.

4. The axle assembly of claim 1 wherein the carrier housing partition wall includes an inlet port that receives lubricant from the carrier housing cavity and the outlet port that routes lubricant out of the carrier housing lubricant reservoir.

5. An axle assembly comprising:
a housing that includes:
a center portion and first and second arm portions that extend from the center portion, wherein the center portion receives a differential; and
a housing lubricant reservoir that is disposed proximate the center portion and spaced apart from the first and second arm portions, wherein the housing lubricant reservoir has a cavity that receives a lubricant, wherein the housing lubricant reservoir has a housing partition wall that separates the cavity from the differential such that the differential is not disposed in the housing lubricant reservoir; and
a carrier housing that is mounted to the housing, wherein the carrier housing has an internal surface and a differential bearing support that rotatably supports the differential and is disposed in the center portion and is mounted on the internal surface, wherein the differential bearing support has a mounting hole that receives a fastener that couples the differential bearing support to the carrier housing and has a differential bearing support lubricant reservoir that is disposed inside the differential bearing support and that receives the lubricant.

6. The axle assembly of claim 5 wherein the housing partition wall has an inlet port that receives lubricant from the center portion and an outlet port that provides lubricant to the center portion.

7. The axle assembly of claim 5 wherein the carrier housing has a carrier housing lubricant reservoir that is at least partially defined by the carrier housing and a carrier housing partition wall that is disposed in the carrier housing, wherein the housing lubricant reservoir is fluidly connected to the carrier housing lubricant reservoir by an outlet port.

8. The axle assembly of claim 5 wherein the differential bearing support has a face surface that faces toward and engages the internal surface of the carrier housing, wherein the differential bearing support and the internal surface cooperate to define the differential bearing support lubricant reservoir.

9. An axle assembly comprising:
a housing;
a carrier housing that is mounted to the housing;
a channel that is disposed between the housing and the carrier housing and that has an inlet and an outlet, wherein the housing and carrier housing cooperate to at least partially define the channel; and
a seal that is disposed in the channel, wherein the seal is inserted into the channel via the inlet after the carrier housing is mounted to the housing and extends to the outlet.

10. The axle assembly of claim 9 wherein the seal engages the housing and the carrier housing and extends continuously through the channel from the inlet to the outlet such that the seal exits the channel at the outlet.

11. The axle assembly of claim 9 wherein the inlet is disposed between the housing and the carrier housing such that the housing and the carrier housing cooperate to define the inlet.

12. The axle assembly of claim 9 wherein the outlet is disposed between the housing and the carrier housing such that the housing and the carrier housing cooperate to define the outlet.

13. The axle assembly of claim 9 wherein the inlet and the outlet are disposed between the housing and the carrier housing such that the housing and the carrier housing cooperate to define the inlet and the outlet.

14. The axle assembly of claim 9 wherein the carrier housing defines a carrier housing cavity and has a flange portion that extends around the carrier housing cavity, wherein the flange portion has a set of fastener holes in which each fastener hole is configured to receive a fastener that couples the carrier housing to the housing, wherein the channel is disposed between and is spaced apart from the carrier housing cavity and the set of fastener holes.

15. The axle assembly of claim 14 wherein the channel is a groove that is disposed in the flange portion.

16. The axle assembly of claim 14 wherein the channel is a groove that is disposed in the housing adjacent to the flange portion.

17. The axle assembly of claim 14 wherein the inlet is a hole that extends through the flange portion.

18. The axle assembly of claim 14 wherein the inlet and the outlet are spaced apart from each other and are disposed proximate a perimeter surface of the flange portion.

19. The axle assembly of claim 14 wherein the channel has a first channel portion and a second channel portion, wherein the first channel portion and the second channel portion extend around opposite sides of the carrier housing cavity such that the first channel portion and second channel portion both receive the seal from the inlet and both provide the seal to the outlet.

20. The axle assembly of claim 9 further comprising an RFID tag disposed on the housing.

\* \* \* \* \*